(12) United States Patent
Rajaram

(10) Patent No.: US 9,141,687 B2
(45) Date of Patent: Sep. 22, 2015

(54) IDENTIFICATION OF DATA OBJECTS WITHIN A COMPUTER DATABASE

(75) Inventor: Shyamsundar Rajaram, San Francisco, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1317 days.

(21) Appl. No.: 12/243,075

(22) Filed: Oct. 1, 2008

(65) Prior Publication Data

US 2010/0082579 A1 Apr. 1, 2010

Related U.S. Application Data

(60) Provisional application No. 61/024,630, filed on Jan. 3, 2008.

(51) Int. Cl.
*G06F 17/30* (2006.01)

(52) U.S. Cl.
CPC ................... *G06F 17/30607* (2013.01)

(58) Field of Classification Search
CPC ............ G06F 17/30265; G06F 17/30333; G06F 17/30607
USPC ............ 707/999.006, 802, 747, 759
See application file for complete search history.

(56) References Cited

U.S. PATENT DOCUMENTS

| | | | |
|---|---|---|---|
| 4,933,892 A * | 6/1990 | Nakaya et al. ................ | 708/401 |
| 2002/0116291 A1 | 8/2002 | Grasso et al. | |
| 2004/0148330 A1 | 7/2004 | Alspector et al. | |
| 2005/0138160 A1 * | 6/2005 | Klein et al. ................... | 709/223 |
| 2006/0020662 A1 | 1/2006 | Robinson | |
| 2006/0236248 A1 * | 10/2006 | Eischeid et al. .............. | 715/751 |
| 2006/0287996 A1 | 12/2006 | Kender et al. | |
| 2007/0005437 A1 | 1/2007 | Stoppelman | |
| 2007/0198481 A1 * | 8/2007 | Hogue et al. ...................... | 707/3 |
| 2007/0198499 A1 * | 8/2007 | Ritchford et al. ................. | 707/4 |
| 2008/0183741 A1 * | 7/2008 | Gaurav et al. ................ | 707/102 |
| 2009/0063532 A1 * | 3/2009 | Gaurav ......................... | 707/102 |
| 2009/0171907 A1 * | 7/2009 | Radovanovic ..................... | 707/3 |

OTHER PUBLICATIONS

X. Wang, "Survey of Recent Research on Hash Functions", Jun. 4, 2008, Lorentz Center, www.lorentzcenter.nl.*
H. Finch, "Comparison of Distance Measures in Cluster Analysis with Dichotomous Data", 2005, Journal of Data Science.*

(Continued)

*Primary Examiner* — Christyann Pulliam
*Assistant Examiner* — Sheryl Holland
(74) *Attorney, Agent, or Firm* — Michael A. Dryja

(57) ABSTRACT

Provided are, among other things, systems, methods and techniques for identifying matching objects in a computer database. In one representative technique, a set of attribute-value pairs corresponding to a query data object are input, with individual ones of the attribute-value pairs including an identified attribute and a value for the identified attribute; multiple characteristic fingerprints are assigned to individual ones of the attribute-value pairs in the set, the characteristic fingerprints having been selected from an attribute-specific field of available characteristic fingerprints based on the value for the identified attribute; a subset of at least one characteristic fingerprint is selected from across the characteristic fingerprints for the query data object, based on a selection criterion, and a database is queried using the subset of at least one characteristic fingerprint to identify any matches.

17 Claims, 7 Drawing Sheets

(56) References Cited

OTHER PUBLICATIONS

Bergmaschi et al., "Extracting Relevant Attribute Values for Improved Search", 2007, IEEE.*

F. Gerace, et al; "A Scalable Algorithm for high Quality clustering of Web Snippets"; abstract; SAC 06 Apr. 23-27, 2006, dijon , France.

Deept Kumar, et al; "Algorithms for Storytelling"; abstract; Department of computer Science, virgina Tech VA ; contact naren@cs.vt.edu.

J R Curran, "Automatic thesaurus Extraction"; Institute for communicationg and collaborative systems; Aug. 31, 2001.

Geraci, F., Pellegrini, M., Pisati, P., and Sebastiani, "A scalable algorithm for high-quality clustering of web snippets", In Proceedings of the 2006 ACM Symposium on Applied Computing (Dijon, France, Apr. 23-27, 2006). SAC '06. ACM, New York, NY, 1058-1062. DOI= http://doi.acm.org/10.1145/1141277.1141527.

Kumar, D., Ramakrishnan, N., Helm, R. F., and Potts, "Algorithms for storytelling", In Proceedings of the 12th ACM SIGKDD international Conference on Knowledge Discovery and Data Mining (Philadelphia, PA, USA, Aug. 20-23, 2006). KDD '06. ACM, New York, NY, 604-610. DOI= http://doi.acm.org/10.1145/1150402.1150475.

James R. Curran, "Automatic Thesaurus Extraction", Institute for Communicating and Collaborative Systems, Division of Informatics, University of Edinburgh, Aug. 31, 2001.

* cited by examiner

71 — 1  1  0  0    70

72 — 0  1  1  0

73 — 0  0  1  1

CIRCULANT MATRIX FOR DISTRIBUTING
CHARACTERISTIC FINGERPRINTS - LINEAR SCALE

CIRCULANT MATRIX FOR DISTRIBUTING
CHARACTERISTIC FINGERPRINTS - CIRCULAR SCALE

FIG. 4

IDENTIFICATION OF DATA OBJECTS WITHIN A COMPUTER DATABASE

FIELD OF THE INVENTION

The present invention pertains to the creation and querying of databases, e.g., for use in a computer system.

BACKGROUND

It sometimes is the case that one wishes to query a very large database with respect to an input data object, i.e., in order to identify other data objects within the database that are identical or very similar to the input data object. Identifying data objects that are identical to the input data object generally can be performed very quickly using straightforward techniques. Unfortunately, merely identifying data objects that are exactly identical often still not be very useful, because a data object with even a slight difference would not be detected.

As a result, certain techniques have been developed that are capable of identifying both exact and close matches fairly quickly. One such technique uses a locality sensitive hashing scheme called Min-Hash/Max-Hash, with the probability of a match being defined by the Jaccard similarity measure. Generally speaking, such an approach identifies matches with a probability that is equal to the degree of overlap between an input set and another set within the database, so that the more information that the two sets have in common, the more likely that the other set will be identified as a match.

While the foregoing approach works well in certain situations, the present inventor has discovered that it is not even applicable in a number of other situations.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

FIG. 3 illustrates the use of a circulant matrix for distributing characteristic fingerprints to individual values for a given attribute, where such individual values lie along a linear scale;

FIG. 4 illustrates the use of a circulant matrix for distributing characteristic fingerprints to individual values for a given attribute, where such individual values lie along a circular scale;

DESCRIPTION OF THE PREFERRED EMBODIMENT(S)

Figure 1:
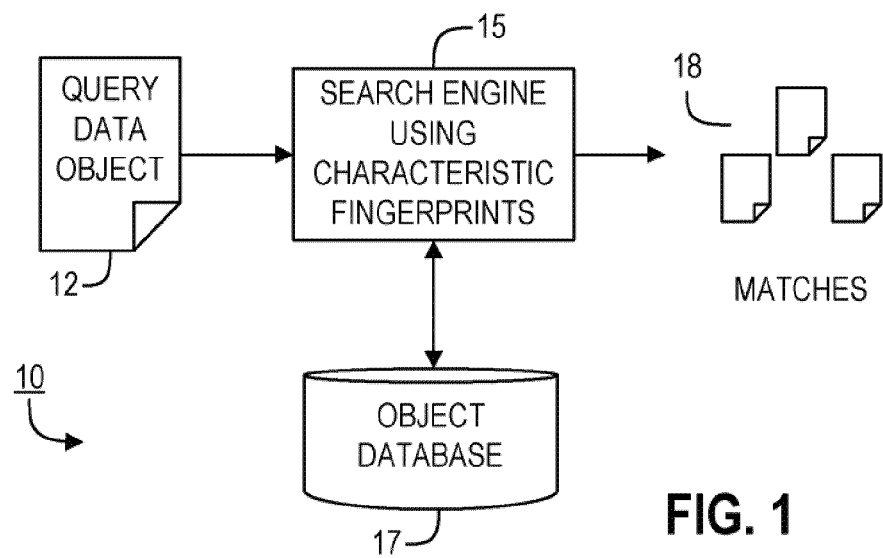
FIG. 1 is a block diagram illustrating a database-searching system.

FIG. 1 is a block diagram illustrating a system 10 according to a representative embodiment of the present invention. As shown, system 10 contemplates, as an input, a query data object 12, which can be any chunk of information, but preferably includes (or can be processed to produce) a set of attributes pertaining to some existing person, place, object, phenomenon or circumstance (collectively referred to herein as an "object"), together with values for some or all of such attributes.

For example, if the data object pertains to a person, the attributes could include any or all of the following, to the extent known: preferences (e.g., movies, books, restaurants), date of birth, current and past addresses, hair color, eye color, height, weight, schools attended, grade point average at each school, major (if any) at each school, current and past interests, current and past occupations, friends, memberships, recent purchases, children, and so on. As will be apparent, some of these attributes sill have values associated with them (e.g., height and weight) while others still not (e.g., lists of friends or schools attended).

In any event, the data object 12 preferably is input into a search engine 15 according to the present invention. Generally speaking, search engine 15 identifies any data objects within a database 17 that are "similar" to the query data object 12 by using what are referred herein to as "characteristic fingerprints". The preferred techniques implemented by search engine 15 can be thought of as extensions of the conventional Min-Hash/Max-Hash-Jaccard similarity measure approach mentioned above. More specifically, such preferred techniques often allow one to find similar data objects based not only on degree of overlap in terms of set elements, but also on values assigned to individual attributes. That is, it is often possible to locate similar data objects based on both the existence of overlapping attributes and the closeness in values assigned to those attributes.

One particular application of the present invention is in the area of collaborative filtering. For example, a large group of people might rate movies, books, restaurants or any other products or services and then, based on these ratings, products and services can be suggested to individuals based on similarities in ratings (as discussed in more detail below). That is, the system first attempts to identify matches (e.g., other users) for a particular end user and then delivers content to the end user based on information regarding at least one of the matches that have been identified.

Alternatively, the data object could be a text document where the attribute-value pairs correspond to the number of times each word (or each keyword that has been identified in the document) appears.

Still further, one might have a partial list of information for an individual and would like to find any similar individuals within database 17 (e.g., for identifying a criminal suspect or for finding a potential match in a dating service). In fact, in many cases finding a perfect match often is not desirable, e.g., because the information in the query data object 12 might not be perfectly accurate (such as is often the case in the example of searching for a criminal suspect) or because a certain number of differences are desirable (such as in the dating service example). However, all other things being equal, it generally is desirable that larger differences in values for a given attribute should be penalized more in the output search results, i.e., the identified matches 18. It is noted that the term "match", as used herein, refers to a situation in which two data objects are judged to be sufficiently similar to each other, typically by satisfying some specified matching criterion; a requirement of an identical match is not to be implied. Instead, where an identical match is intended herein, the words "identical match" are used.

Figure 2:
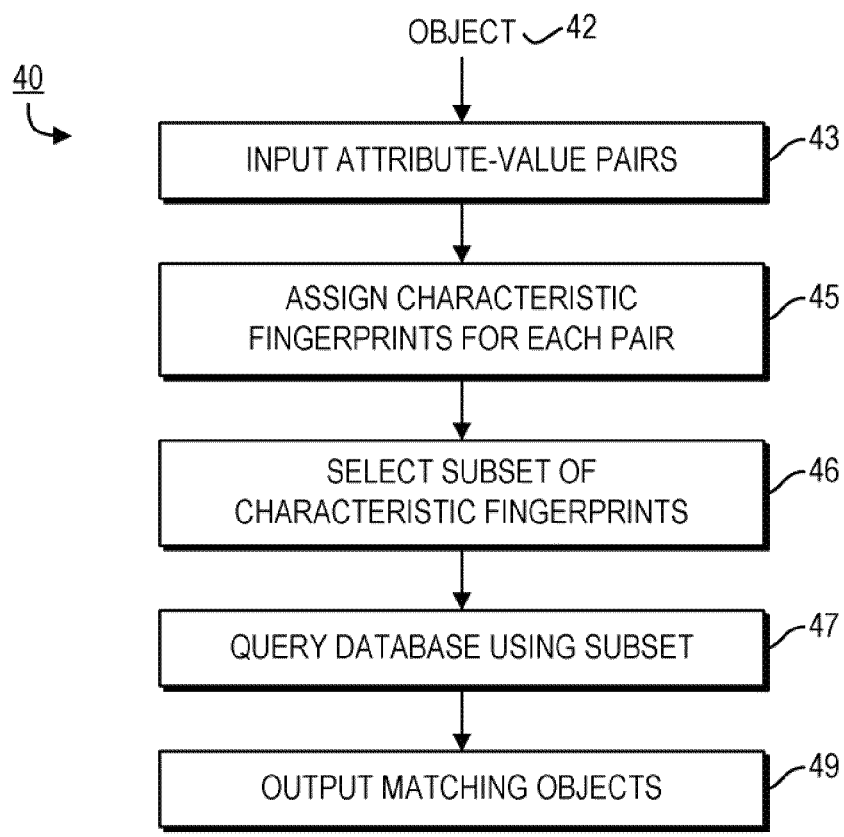
FIG. 2 is a flow diagram illustrating a process for identifying matching data objects using characteristic fingerprints.

A process 40 that is used by search engine 15 in a representative embodiment of the invention is illustrated in FIG. 2. Preferably, the steps of process 40 are performed in a fully automated manner so that the entire process 40 can be performed by executing computer-executable process steps from a computer-readable medium (which can include such process steps divided across multiple computer-readable media), or in any of the other ways described herein.

Initially, in step 43 plural attribute-value pairs are input for a corresponding object 42. As noted above, such attribute-value pairs preferably characterize the object 42 in some manner. The actual generation of such attribute-value pairs can be done manually (e.g., when collecting certain personal profile information for an individual), by one or more other automated processes (e.g., using text-processing software to count words or extract and count keywords, or using image-processing software to generate attribute-value features from a photographic object), or any combination of the two. Also, even where data are collected manually, some amount of normalization or other pre-processing can be performed. For example, in an embodiment in which each data object is a list of movie ratings made by a single individual, the ratings for each individual might be normalized so that the mean and/or standard deviation of the ratings is constant across all individuals. Ordinarily, the manner in which such attribute-value pairs is generated is not important to the process 40.

In addition to such attribute-value pairs, attributes without corresponding values also can be input. In fact, the generalized attribute-value pair concept of the present invention can be thought of as a generalization of the attribute-only concept. In this regard, an attribute without a corresponding value can be represented in the techniques of the present invention as an attribute with a value of 1 or 0, where existence of the attribute with a value of 0 is equivalent to a situation where the attribute is absent. It is further noted that the term attribute-value pair refers to the value associated with a particular attribute and encompasses data where the identification of the attribute is implied rather than stated explicitly (such as where the values are in a pre-defined order with each position corresponding to a known attribute).

Ordinarily, however, the order in which the attribute-value pairs appear is unimportant. The value corresponding to each attribute preferably is within a range and of a form that has been pre-defined for that attribute across all entries in the database 17. Typically, the allowable values for an attribute will be any of a set of discrete values at uniform intervals on a linear scale. Usually, there will be at least 3, 5, 10, 15 or 20 different allowable values for a given attribute. For example, a person's height might be required to be entered as a value between 4 feet 10 inches and 6 feet 8 inches, in one-inch intervals (e.g., by rounding any fractions to the nearest inch). However, use of non-uniform intervals and/or any other kind of scale (e.g., through the use of a mapping function) also are contemplated. For purposes of the present embodiment, it generally is assumed that the values for each attribute are discrete and uniformly distributed and that any pre-processing to put the data into such a format has already been performed.

In step 45, a different group of characteristic fingerprints preferably is assigned for each attribute-value pair. For this purpose, it is preferred that a different field of characteristic fingerprints has been designated for each attribute and that the groups for different values of that attribute are drawn in the same manner from that the field across all data objects (e.g., included all data objects in database 17). Accordingly, implementation of this step 45 preferably involves selecting the appropriate group of the characteristic fingerprints (within the attribute-specific field) that corresponds to the present value for that attribute. Then, the selected characteristic fingerprints preferably are added to the total set of characteristic fingerprints for the present query data object 12. This selection process is repeated for each attribute-value pair within the input query data object 12, thereby progressively building up the total set of characteristic fingerprints for the present query data object 12.

Several concepts are now discussed with reference to the assignment of characteristic fingerprints in the preferred embodiments of the invention. In particular, the following paragraphs discuss how the characteristic fingerprints can be generated, different ways in which the fields can be constructed, and different techniques for assigning groups of the characteristic fingerprints from the designated field to the individual attribute-value pairs. Several examples are presented to illustrate these concepts. However, such examples should not be taken as limiting.

The present invention generally contemplates attributes whose values are selected from a finite set of discrete potential values. When designing a database-searching system (e.g., system 10) according to the present invention, one of the first parameters selected for each of the possible attributes preferably is the set of allowable values that such attribute can have (e.g., whether a rating scale is to be from 1 to 4 or from 1 to 10). The number of allowable values is referred to herein as K. In certain of the embodiments discussed below, K is constant across all attributes, while in other embodiments it differs from attribute to attribute.

After selecting K, another parameter to consider is how far apart values for that parameter can be before corresponding data objects are determined not to have any commonality with respect to the present attribute. This value is referred to herein as the "cutoff parameter" C. For example, in a collaborative filtering application, if one person rated a particular movie 8 out of 10, it might be considered highly relevant that another individual also rated the same movie 8 out of 10, less relevant if that other individual rated the movie 7 or 9 out of 10, and not at all relevant if that other individual rated the movie 6 or 10 out of 10. In this example, the cutoff parameter C is 2. That is, any rating differences of 2 or more would be interpreted as meaning that the corresponding two individuals do not have that movie in common.

A still further parameter that preferably is selected is the size of the field of the characteristic fingerprints for each one of the possible attributes. Preferably, where the potential attribute values are uniformly distributed along a linear scale, the minimum size of the field for a given attribute preferably is K+C−1, and where the potential attribute values are uniformly distributed along a circular scale, the minimum size of the field for a given attribute preferably is K.

Another determination to be made is how the characteristic fingerprints within the field are to be generated. In the preferred embodiments of the invention, each field is comprised of random or pseudo-random characteristic fingerprints, the fields are different for different attributes, and the likelihood of duplicate characteristic fingerprints across all attributes is remote. Accordingly, the characteristic fingerprints preferably are cryptographic hashes (e.g., MD-5, the message digest algorithm 5, or SHA-1, the secure hash algorithm 1) of some unique identification code I for the attribute together with some unique (typically arbitrary) identification code f for each characteristic fingerprint within the field, i.e., H(I;f), where H(•) represents a hashing operation, x;y indicates the concatenation or other unique combination of the two variables x and y, and f can, for example, vary from 1 to the total number of characteristic fingerprints to be included within the field. Although use of a cryptographic hash to generate the characteristic fingerprints is preferred for its simplicity and extensibility, the characteristic fingerprints instead could be generated as random values.

Finally, a determination preferably is made as to how the individual characteristic fingerprints within the field are to be assigned to each potential value for the attribute. Several examples follow.

In a first embodiment, a field of K+C−1 characteristic fingerprints is generated, e.g., using a hash function as described above. Next, a circulant matrix M is constructed, with M having K rows (each representing a different one of the K possible values for the attribute) and K+C−1 columns (each representing a different one of the available characteristic fingerprints), with the first row including C ones followed by zeros in the remaining columns. A circulant matrix has the property that any row in the matrix is a circularly shifted version of its top row.

For example, the circulant matrix 70 corresponding to K=3 and C=2 is shown in FIG. 3. The characteristic fingerprints for an attribute with a value k are then given by the fingerprints corresponding to the locations of ones in the $k^{th}$ row of M. In the present example, where K=3 and C=2, row 71 corresponds to the value of k=1, row 72 corresponds to the value of k=2 and row 73 corresponds to the value of k=3. More specifically, assume that the present attribute, with identification code I, has assigned to it the 3+2−1 characteristic fingerprint set {a,b,c,d}. The allocation of characteristic fingerprints among the 3 potential values for the attribute I is as follows:
{a,b} is assigned to (I,1),
{b,c} is assigned to (I,2) and
{c,d} is assigned to (I,3).

The foregoing embodiment is appropriate in situations where distance between values is calculated along a line or in similar circumstances involving distances in Cartesian coordinates, which most often is the case. In the example above, the values for attribute I of 1 and 3 are the most distantly separated on a linear scale.

However, in other embodiments, such as where the values for a particular parameter correspond to angles, a circular or other closed-loop scale is more appropriate. An example an allocation matrix 90 that employs a circular scale is shown in FIG. 4. Here, a field of K characteristic fingerprints is generated, and the circulant matrix has K rows and K columns, but again with the first row including C ones followed bay zeros in the remaining columns. Thus, in the present example where K=5, the matrix 90 has 5 rows and 5 columns, and the values allocated to each of the 5 values 1-5 are defined by rows 91-95, respectively. Unlike the analogous linear case, here, values of k=1 and k=5 share a characteristic fingerprint, i.e., the first one in the field, corresponding to the first column 98 in the matrix 90.

Most of the following discussion will assume that the parameter values occupy a range within a Cartesian-based system, rather than a circular-based system. However, this choice merely reflects the most common scenarios and is not intended to be limiting in any manner. As indicated above, each such example has a straightforward extension to a circular-based system. It is noted that the broader term "Cartesian" is preferred because, as discussed in more detail below, the parameter values can be vectors or scalars.

FIGS. 5A-E illustrate comparisons between different groups of characteristic fingerprints drawn from a field 100. More specifically, group 109 (which is repeated in each of FIGS. 5A-E as a baseline) is assigned to an attribute value of 9, and the groups of characteristic fingerprints 104, 105, 108, 112 and 114, are respectively assigned to attribute values of 4, 5, 8, 12 and 14, in an embodiment in which K=19 and C=5 (for a total field size of 23).

Figure 5A:
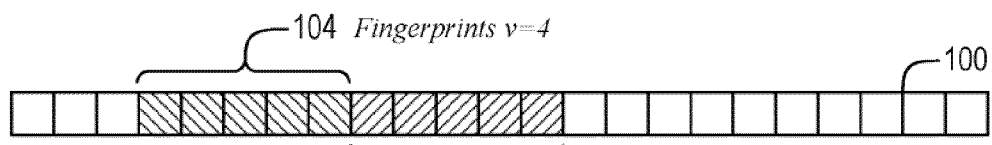
FIGS. 5A-E illustrate a set of characteristic fingerprints assigned to an attribute value that is constant across all such figures in comparison to the sets of characteristic fingerprints assigned to other values for the same attribute, according to a first representative embodiment.
Figure 5B:
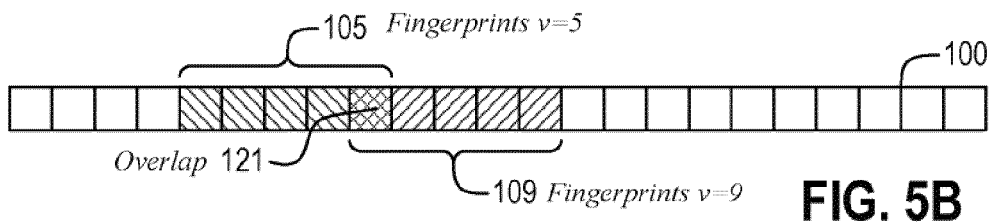
Figure 5C:
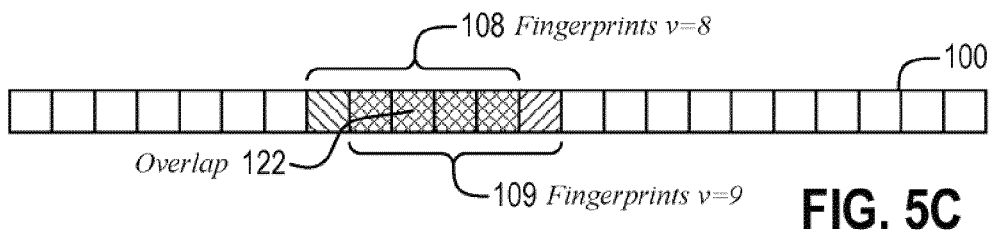
Figure 5D:
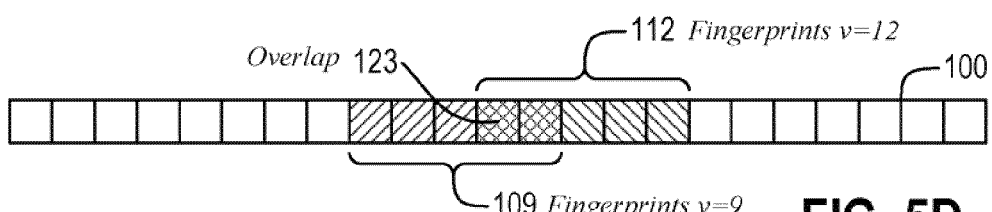
Figure 5E:
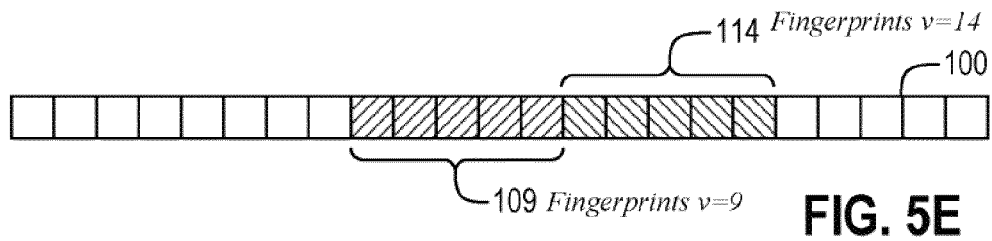

As can be seen in FIGS. 5A-E, the group for each value is simply the group for the previous value right-shifted by one characteristic fingerprint position. Accordingly, when the attribute values are 4 and 9, there is no overlap in their subsets of characteristic fingerprints (FIG. 5A), when the attribute values are 5 and 9 they overlap one characteristic fingerprint 121 (FIG. 5B), when the attribute values are 8 and 9 they overlap four characteristic fingerprints 122 (FIG. 5C), when the attribute values are 12 and 9 they overlap two characteristic fingerprints 123 (FIG. 5D), and when the attribute values are 14 and 9 they once again do not overlap at all (FIG. 5E).

Figure 6:
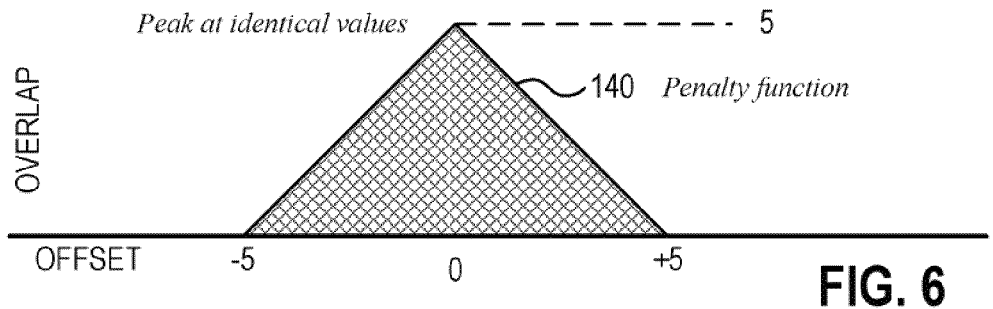
FIG. 6 illustrates the penalty function resulting from the characteristic fingerprint assignment according to the first representative embodiment.

FIG. 6 illustrates a graph 140 of the relationship between the difference (or offset) between two attribute values and the corresponding amount of overlap in their characteristic fingerprint subsets in the foregoing example (ignoring the fact that the true values are discrete integers). Within the context of the present invention, as indicated below, this graph 140 can be interpreted as the penalty function for deviating from a situation where two attribute values match identically. As will be readily appreciated, penalty function 140 is triangularly shaped and vertically symmetric around an offset value of zero, where its peak is also located. In other words, the maximum amount of overlap occurs when two attribute values are identical and then declines linearly with the absolute value of the difference in their values until reaching zero at an absolute difference of C (where C=5 in the present example). As discussed in more detail below, such linearly declining overlap often is a very desirable property.

In the foregoing embodiments, the field 100 of available characteristic fingerprints for a given attribute is represented as a one-dimensional sequence or vector of values, and each attribute value is assigned an equal-length contiguous subsegment within that larger field. While the foregoing embodiment provides a good model for the purposes of the present invention, several generalizations can be made in order to expand the flexibility that can be achieved with a system according to the present invention.

At the outset, it is noted that in certain embodiments of the invention, all of the attributes share the same number of potential attribute values (K) and have the same cutoff value (C). As a result, using the preceding embodiment, all of the attributes will have the same overlap profile (similar to profile 140). While this outcome is desirable in certain circumstances, in other cases it is desirable to weight different attributes differently.

Similarly, in other embodiments of the invention the values for K and/or C are allowed to be defined differently for different attributes, thereby customizing such values to the properties of the particular attribute, as well as to its inherent or desired value granularity. However, allowing the values for K and/or C to vary across different attributes generally would result in the usually unintended side effect of placing different weights on different attributes (i.e., the peak and the slope of the overlap profile would be different for different attributes).

In both of the foregoing situations, therefore, it is sometimes desirable to be able to adjust weights on different attributes, e.g., either because some attributes actually are more important than others or because one would like to correct for differing values of K and/or C. One approach to adjusting such weights is to independently vary the field sizes, as well as the corresponding numbers of characteristic fingerprints assigned, for different attributes.

The preferred approach in this regard is to extend the field into two dimensions and to independently very the height of the field for different attributes. An example of such a field 160 is shown in FIGS. 7A-E, which precisely mirrors the above example (shown in FIGS. 5A-E), except that each characteristic fingerprint in the above example is replaced with two characteristic fingerprints in the present example.

Figure 7A:
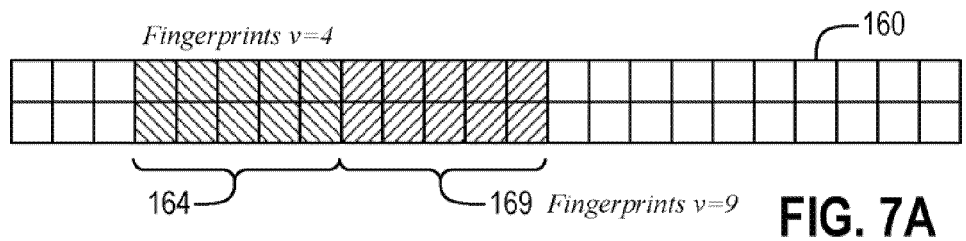
FIGS. 7A-E illustrate a set of characteristic fingerprints assigned to an attribute value that is constant across all such figures in comparison to the sets of characteristic fingerprints assigned to other values for the same attribute, according to a second representative embodiment.
Figure 7B:
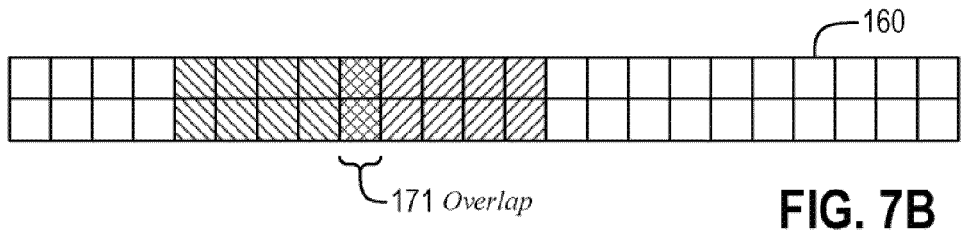
Figure 7C:
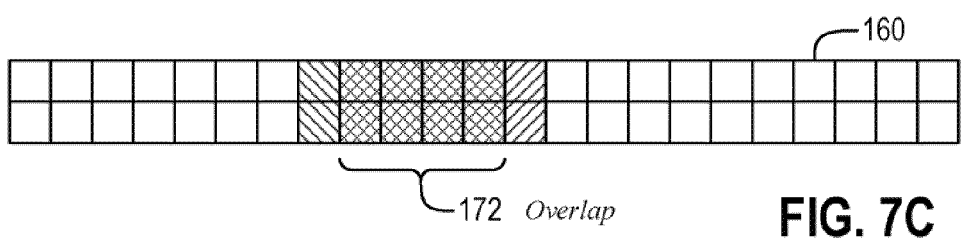
Figure 7D:
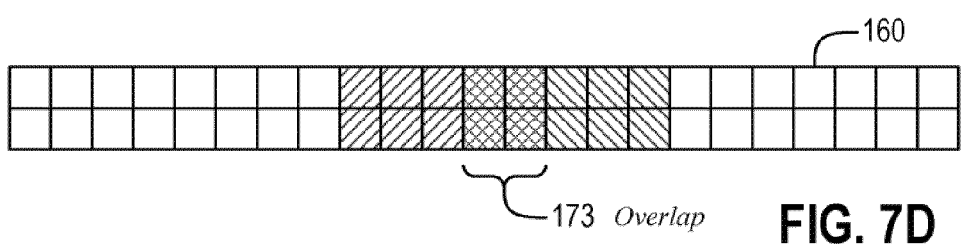
Figure 7E:
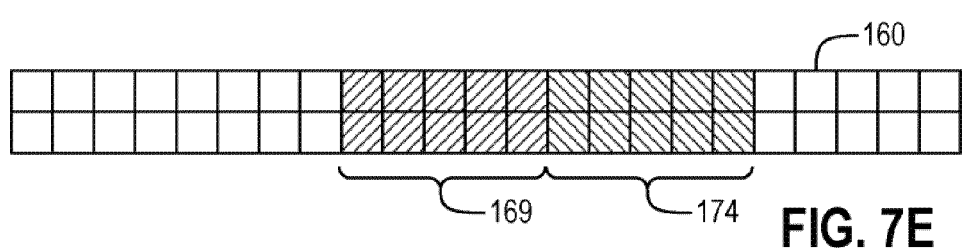
Figure 8:
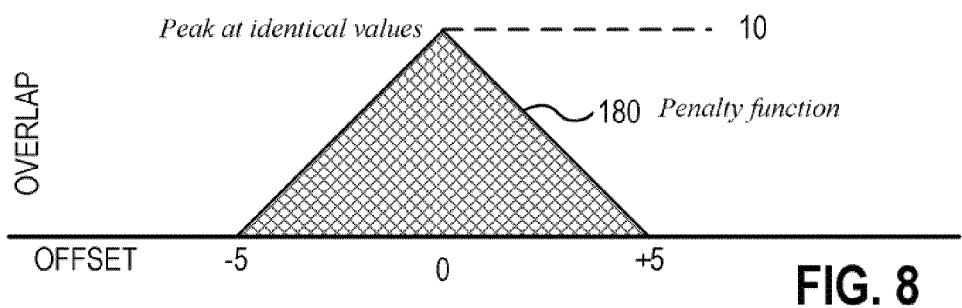
FIG. 8 illustrates the penalty function resulting from the characteristic fingerprint assignment according to the second representative embodiment.

In FIG. 7A, a similar contiguous group of characteristic fingerprints 164 is associated with the attribute value 4, and a similar contiguous group of characteristic fingerprints 169 is associated with the attribute value 9, but each group has twice as many characteristic fingerprints, as compared to the above example. FIGS. 7B-E similarly mirror FIGS. 5B-E, respectively. As a result, the overlaps 171-173 in FIGS. 7B-D have twice as many characteristic fingerprints as in the corresponding FIGS. 5B-D (with, of course, still no overlap between the ranges and 164 and 169 in FIG. 7A or the ranges 169 and 174 in FIG. 7E). The resulting penalty function 180 in FIG. 8 has the identical shape as overlap graph 140 in FIG. 6, but has all of its values scaled by a factor of two (with a peak of 10). Accordingly, if a first attribute has the characteristic fingerprint allocation as indicated in FIGS. 5A-E and a second attribute in the same embodiment has the characteristic fingerprint allocation as indicated in FIGS. 7A-E, then the second attribute effectively will have twice the weight as the first.

It is a simple extension to create the kind of field 160 illustrated in FIGS. 7A-E. One need only define multiple characteristic fingerprints for each position within the width of characteristic fingerprints, e.g., using additional values for identification code f within H(I;f).

As indicated, the field 160 is best visualized as a two-dimensional field of characteristic fingerprints. Extending the available field into two dimensions allows even greater flexibility than simply adjusting weights among the different attributes. For example, such an extension allows one to control the shape of the penalty function, making it possible to deviate from the symmetric triangular shapes 140 and 180 that resulted from the preceding embodiments.

Figure 9A:
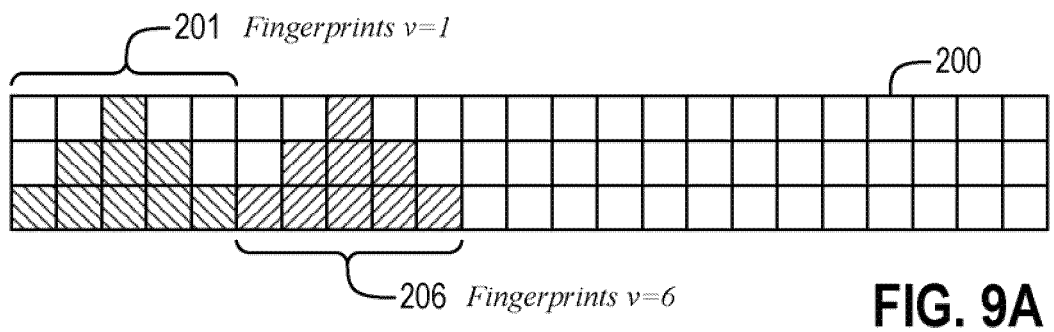
FIGS. 9A-C illustrate a set of characteristic fingerprints assigned to an attribute value that is constant across all such figures in comparison to the sets of characteristic fingerprints assigned to other values for the same attribute, according to a third representative embodiment.
Figure 9B:
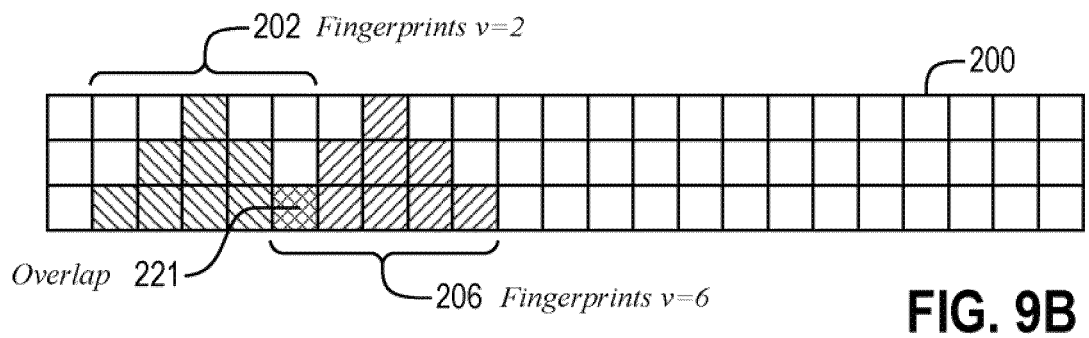
Figure 9C:
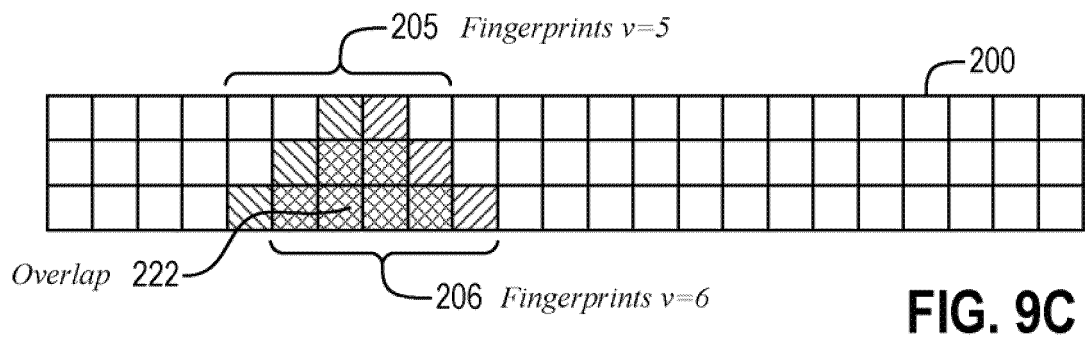

An example is illustrated in FIGS. 9A-C. Here, the characteristic fingerprints assigned to each of the potential values for the attribute are drawn from the two-dimensional field 200 of characteristic fingerprints. Unlike the previous embodiments, in which the pattern of characteristic fingerprints for a particular attribute value is best visualized as a line segment (in the single-dimensional case) or a rectangle (in the two-dimensional case), the present pattern is in the shape of a triangle. More specifically, in FIG. 9A the group of characteristic fingerprints 201 corresponds to an attribute value of 1 and the identically shaped, but shifted, group of characteristic fingerprints 206 corresponds to an attribute value of 6. As in the previous embodiments, the width of each group is 5 characteristic fingerprints. Although the available characteristic fingerprints no longer are allocated in a simple uniform manner, the width still represents the cutoff value (i.e., the value at which the difference between two attribute values results in no further overlap). Because the two attribute values represented in FIG. 9A differ bad exactly 5, their characteristic fingerprints do not overlap.

When comparing an attribute value of 2 to an attribute value of 6, as shown in FIG. 9B, the respective subsets of characteristic fingerprints, 202 and 206, overlap by exactly one characteristic fingerprint 221. Then, when the attribute values are 5 and 6, as shown in FIG. 9C, the respective groups of characteristic fingerprints, 205 and 206, overlap by six characteristic fingerprints 222. A comparison of the normalized overlap values for the present embodiment (which uses a triangular pattern) to the previous two embodiments (which use a rectangular pattern) is as follows:

| Offset | Rectangular | Triangular |
|---|---|---|
| 0 | 1.00 | 1.00 |
| 1 | 0.80 | 0.67 |
| 2 | 0.60 | 0.44 |
| 3 | 0.40 | 0.22 |
| 4 | 0.20 | 0.11 |
| 5 | 0.00 | 0.00 |

Figure 10:
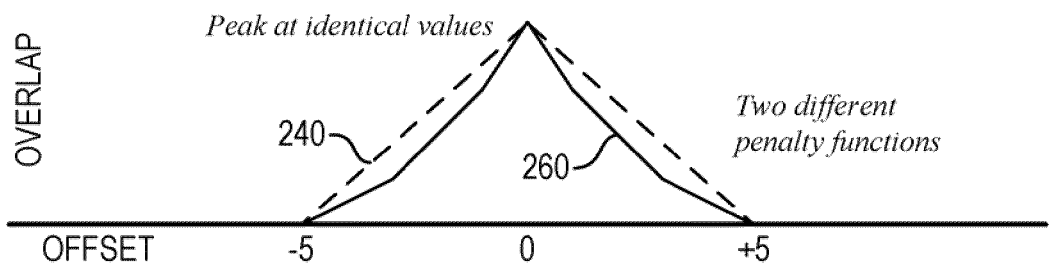
FIG. 10 illustrates the penalty function resulting from the characteristic fingerprint assignment according to the third representative embodiment, as compared to the penalty function resulting from the characteristic fingerprint assignments according to the first and second representative embodiments.

A comparison of the corresponding normalized penalty function 240 for a rectangular pattern to the normalized penalty function 260 for the foregoing triangular pattern is illustrated in FIG. 10. As will be readily appreciated, the triangular shape of the present embodiment results in a sharper falloff (i.e., higher penalties for small deviations) than the rectangular shape of the preceding embodiments.

Generalizing from the foregoing embodiments, it can be seen that the penalty function is simply the convolution of the characteristic fingerprint assignment pattern with itself, i.e., essentially the autocorrelation of the characteristic fingerprint assignment pattern. Accordingly, it is possible to design the shape of the desired penalty function (within the limits of the resolution of the field of characteristic fingerprint values) using well-known techniques for designing discrete time finite impulse response filters.

In the present embodiments, the field of characteristic fingerprints is no longer tied as closely to particular attribute values, but rather is constructed as a kind of general background field from which the desired patterns can be drawn. Nevertheless, it can be constructed in the same manner discussed above, simply by using a large number of values for the identification code f within H(I;f).

The foregoing techniques describe certain ways in which groups of characteristic fingerprints can be assigned to attribute-value pairs. In the preferred embodiments, the different groups of characteristic fingerprints are identified by shifting a selection template a fixed amount over the attribute-specific field of available values for each increment in the potential value for the identified attribute. Thus, for example, in the specific embodiments described above, a rectangular or triangular pattern is shifted (either linearly or circularly, depending upon the scale involved) one position to the right for each increment in the attribute value k.

In alternate embodiments, other kinds of patterns and/or other kinds of shifting are used to select such groups of characteristic fingerprints, with any or all of the configuration of the field, the template pattern and the kind of shifting potentially being different for each different attribute. The use of different patterns to achieve different penalty functions when shifting linearly has been discussed above. In certain embodiments, it can be desirable to use rotation shifting, i.e., rotating the template instead of (or in addition to) shifting it linearly.

The discussion above begins with a one-dimensional field and then extends to embodiments using two-dimensional fields. More generally, the field of characteristic fingerprints can be configured to have any arbitrary number of dimensions, and the templates used similarly can have any number of dimensions. Use of higher-dimensional fields of characteristic fingerprints, e.g., is particularly preferable where the attribute value itself is a vector, in which case the amount and kind of template shifting often will depend upon the particular vector element whose value has been incremented. In any event, it ordinarily is preferred that the template shifting that corresponds to a change from one attribute value to the very next available discrete attribute value is performed in a constant and uniform manner, and the size and shape of the template remains fixed.

One exception is where one wishes to weight different attribute values differently. Consider, for example, an attribute representing a person's height. Attribute values near the mean (i.e., in the "normal" range) might be assigned a certain number of characteristic fingerprints, while values at increasing distances from the mean are assigned higher numbers of characteristic fingerprints, on the assumption that a match (or near match) of an unusual characteristic (e.g., two people were both unusually short or usually tall) is more significant than a match (or near match) of an ordinary characteristic (e.g., to people who are in the normal height range). In such embodiments, the size and/or shape of the template used can vary for different values of the same attribute.

In the specific embodiments described above, the selection templates used are symmetric (e.g., a rectangle or an isoceles triangle), with the result being that positive deviations are weighted the same as negative deviations. However, in certain embodiments non-symmetric selection templates can be desirable. For example, in the case described above, for an attribute value that differs from the attribute's mean, deviations toward the mean might be considered less significant than deviations away from the mean, in which case the template pattern for such an attribute value might be skewed with more characteristic fingerprints assigned to the side farthest from the mean than to the side closest to the mean.

Returning now to FIG. 2, the discussion above described different ways in which groups of characteristic fingerprints can be assigned (in step 45) to the various different attribute-value pairs that might occur in the input data object 42. Next, in step 46 a subset of all of the characteristic fingerprints that have been assigned to the data object 42 (i.e., across all attribute-value pairs for the data object 42) is selected. In certain embodiments, this selected subset includes just a single characteristic fingerprint. In other embodiments, the selected subset includes multiple characteristic fingerprints, although preferably only a small fraction of the total number of characteristic fingerprints that have been assigned to the data object 42 (e.g., less than 1% or less than 0.1%).

In either event, the selection criterion preferably is predetermined such that, given a particular collection of characteristic fingerprints that have been assigned to the data object 42, the same subset always will be selected. Because of the nature of the characteristic fingerprints, in certain embodiments it generally will be the case that the particular selection criterion is unimportant, but what is important is the number of characteristic fingerprints selected and the fact that they are uniquely determined in a fixed, predetermined manner. Thus, for example, simple ways to obtain the subset are to select the characteristic fingerprints having the S lowest or S highest values, where S is the desired size of the subset. In other embodiments, the selection criterion can involve multiple sub-criteria, such as selecting the $S_l$ lowest values and the $S_h$ highest values, where the desired size of the subset is $S_l+S_h$. It is noted that the selection criterion preferably is applied across all of the characteristic fingerprints assigned to data object 42, irrespective of the particular attribute-value pairs that caused them to be assigned.

Next, in step 47 the database 17 is queried using the selected subset and a corresponding matching criterion. The matching criterion often will be that in order for a data object within database 17 to match, a similarly generated subset for such data object must be identical to the subset for query data object 42. For example, if the selection criterion is the single characteristic fingerprint having the minimum value, then the minimum characteristic fingerprints for the query data object 42 and the subject data object must be identical in order for the subject and data object to be considered a match. Similarly, if the selection criterion is to select the two characteristic fingerprints having the minimum and second minimum values, then the minimum and second minimum characteristic fingerprints for the query data object 42 and the subject and object must be identical in order for the subject and object to be considered a match according to this matching criterion.

In alternate embodiments, a different matching criterion is used. For example, in one such alternate embodiment, at least two of the three minimum characteristic fingerprint values must match in order for a subject data object within database 17 to be considered a match to the query data object 42.

Finally, in step 49 any matching data objects (e.g., identifiers for them or pointers to them) are output.

Figure 11:
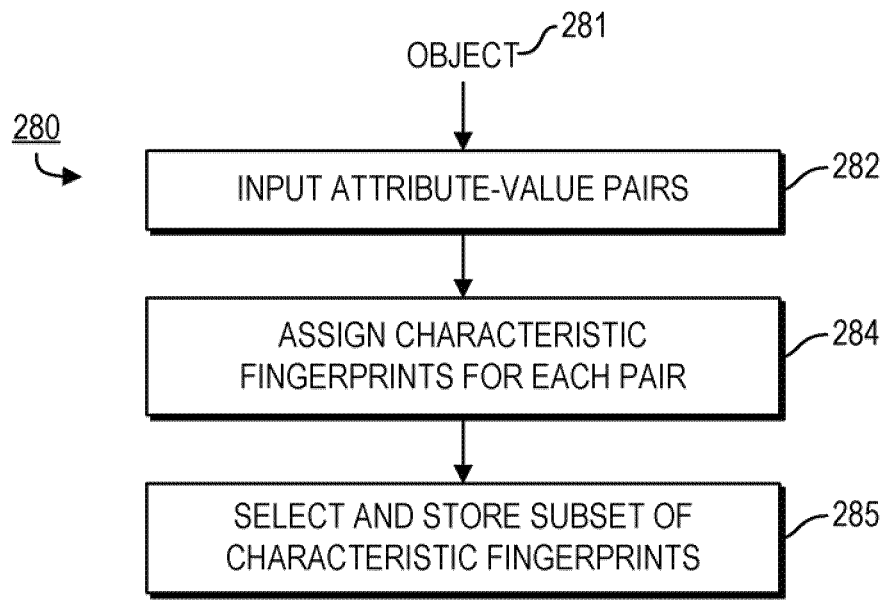
FIG. 11 is a flow diagram illustrating a process for generating and/or organizing a database.

One aspect of the database-searching techniques described above is the existence of a database 17. FIG. 11 is a flow diagram illustrating one process 280 for generating and/or organizing such a database. Preferably, the steps of process 280 are performed in a fully automated manner so that the entire process 280 can be performed by executing computer-executable process steps from a computer-readable medium or in any of the other ways described herein. In the preferred embodiments, the steps of the process 280 are repeated for each data object 281 that is to be included within the database 17.

Initially, in step 282 attribute-value pairs are input for the subject data object 281. Preferably, this step 282 and the considerations pertaining to it are identical to step 43, discussed above.

In step 284, characteristic fingerprints are assigned to each attribute-value pair input in step 282. Preferably, this step 284 and the considerations pertaining to it are identical to step 45, discussed above. In fact, for a given system 10, the same parameters preferably are used for processing the query data object 12 and each data object 281 in database 17.

Finally, in step 285 a subset of the characteristic fingerprints assigned in step 284 is selected and stored in association with the data object 281 (e.g., an identifier for data object 281 or a pointer to it). This subset could be all of the assigned characteristic fingerprints, and in certain embodiments (particularly in embodiments where it is not known in advance what the query matching criterion might be), it can be desirable to define the subset in this manner. However, in most embodiments where the matching criterion is known in advance, only the minimum number of characteristic fingerprints that are required to verify whether the matching criterion is satisfied with respect to a particular query object are included within the stored subset. Thus, for example, if it is known that the matching criterion will only be looking at the minimum characteristic fingerprint, then for each data object, only the minimum characteristic fingerprint preferably is stored in database 17.

Also, in the preferred embodiments the retained subset of characteristic fingerprints is stored in a manner so as to facilitate future querying. Thus, for example, in certain embodiments the characteristic fingerprints are used as an access into an index which stores an indication of which data objects correspond to such characteristic fingerprints. In addition, in embodiments where more than one characteristic fingerprint is to be examined for the purpose of determining whether the matching criterion is satisfied, the identifier for each data object in the index preferably is annotated to include an indication of why the characteristic fingerprint was included within the index (e.g., because it is the lowest characteristic fingerprint value for the data object, because it is the second lowest, etc.).

As noted above, the foregoing embodiments can be seen as an extension of the max/min hash Jaccard similarity approaches. As with that conventional approach, the techniques of the present invention identify matches with a probability that is dependent upon the amount of overlap in the characteristic fingerprints assigned to the data objects. This is a kind of fuzzy matching technique in which two data objects with a significant amount of (but not complete) similarity might not get identified as matches, but data objects with very little similarity occasionally will.

For the linear scale embodiments discussed above in which all attributes have the same scale (K and C) and are assigned equal weights and in which a rectangular pattern template is used (e.g., as described above in connection with FIGS. 3, 5A-E and 6), the similarity measure (which defines the probability of a match) between two data objects $O_1$ and $O_2$ is given as:

$$J_C(O_1, O_2) = \frac{\sum_{i \in |A_1 \cap A_2|} [C - |v_{1i} - v_{2i}|]_+}{C*|A_1| + C*|A_2| - \sum_{i \in |A_1 \cap A_2|} [C - |v_{1i} - v_{2i}|]_+},$$

where $[value]_+ = value*I(value>0)$ ($I(\cdot)$ being the indicator function), $v_{ji}$ is the attribute value for attribute i of data object j, and $A_j$ is set of attributes for which data object j has a value. The above measure reduces to the standard Jaccard similarity measure when K=1 and C=1. It is noted that the contribution of an attribute goes to zero if the absolute weight difference is greater than C.

Figure 12:
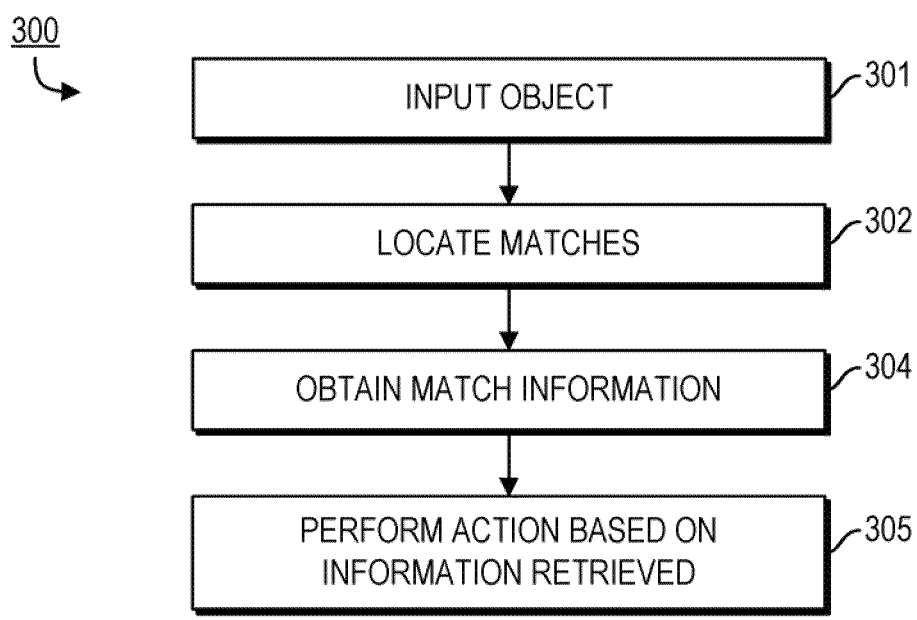
FIG. 12 is a flow diagram illustrating a process for using a database search according to the present invention.

FIG. 12 is a now diagram illustrating a process 300 for using a database search according to the present invention. Preferably, the steps of process 300 are performed in a fully automated manner so that the entire process 300 can be performed by executing computer-executable process steps from a computer-readable medium (which can include such process steps divided across multiple computer-readable media), or in any of the other ways described herein.

Initially, in step 301 a data object is input. In step 302, the data object is used to query a database 17, e.g., using process 40 described above. In step 304, the match information is obtained from the query of step 302. Finally, in step 305 an action is performed based on the match information.

The particular action performed in step 305 typically varies based on the particular embodiment. Thus, for a query of a criminal database, the results might be simply automatically returned to the person making the query. For a dating or matchmaking service, the results might be simply automatically provided to the subscriber corresponding to the input data object. However, in either the foregoing embodiments, the results instead might be automatically provided to another automated process for further (e.g., more detailed) analysis as to whether each match is in fact appropriate (e.g., to eliminate random matches that in fact have very little overlap), before providing the results to an individual.

In alternate embodiments, derivative information is provided to the user based on the matches identified. For example, in a collaborative filtering scenario, if the query identifies two individuals who appear to have very similar interests and/or preferences as the subject individual (about whom the query was formulated), then (potentially after validating such matches using more detailed processing) certain movies or books that those two matching individuals enjoyed might be recommended to the subject individual.

Figure 13:
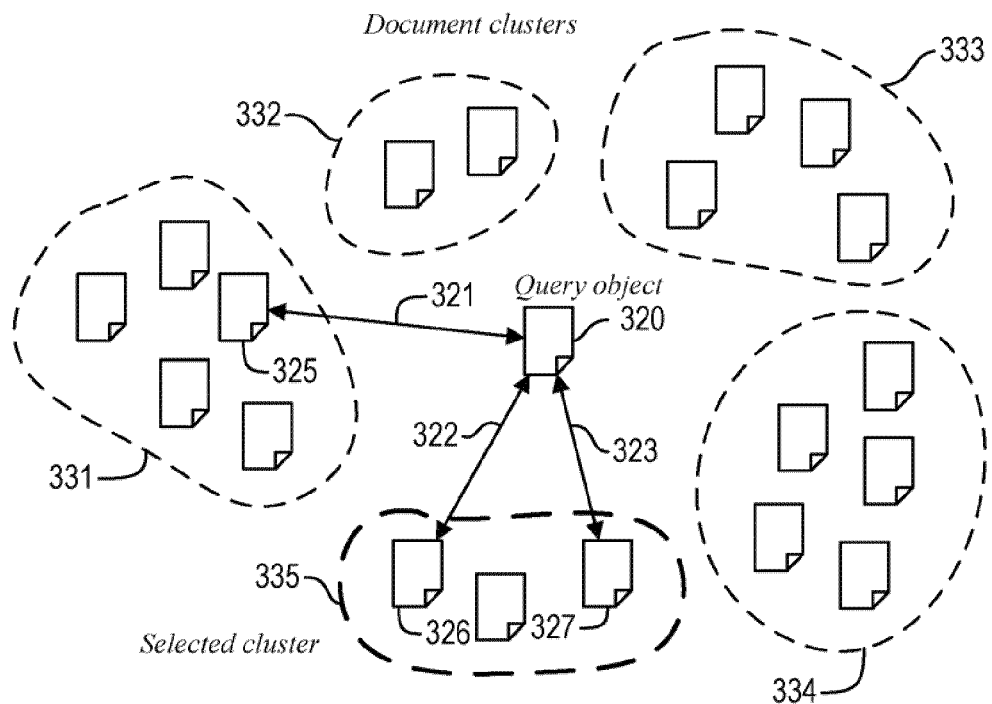
FIG. 13 is a block diagram showing matches between a query data object and various other data objects that have been sorted into clusters.

Still further, the identified matches are used in certain embodiments of the invention for clustering purposes. For example, as shown in FIG. 13, matches 321-323 have been identified between a query data object 320 and respective data objects 325-327 within database 17, along with a variety of other unmatched data objects, that have been previously sorted into clusters 331-335. In the present example, because of the most matches (as well as the highest percentage of matches) were found in cluster 335, it is concluded that query data object 320 is most closely related to cluster 335. Accordingly, the action(s) that might be taken in step 305 based on this conclusion include providing aggregate data from the members of cluster 335 (e.g., book, restaurant or movie recommendations based on preferences of the members of cluster 335, as a whole) and/or incorporating query data object 320 into cluster 335 for future processing purposes.

Figure 14:
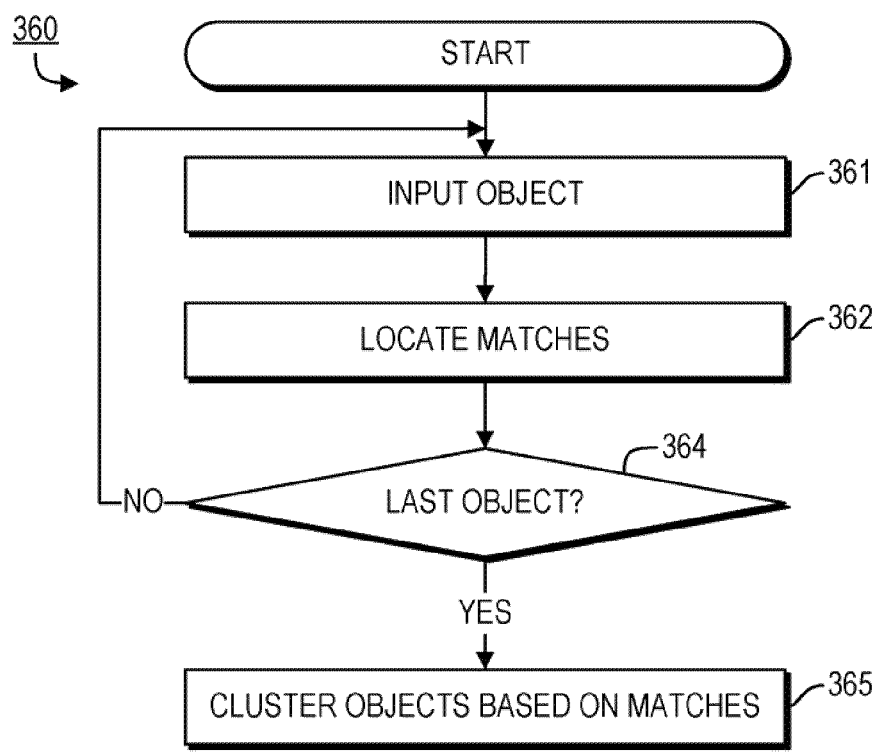
FIG. 14 illustrates a process for generating clusters from an existing set of data objects.

In the preceding embodiments, it is assumed that various clusters 331-335 of data objects already exist. FIG. 14 illustrates a process 360 for generating such clusters from an existing set of data objects according to a representative embodiment of the present invention. Preferably, the steps of process 360 are performed in a fully automated manner so that the entire process 360 can be performed by executing computer-executable process steps from a computer-readable medium, or in any of the other ways described herein.

Initially, in step 361, a data object from the set is input. Then, in step 362 any matches are identified, e.g., using process 40 described above, potentially together with any additional processing that is desired to eliminate spurious matches.

In step 364, a determination is made as to whether the current object is the last one in the set. If not, the process returns to step 361 to process the next object. If so, processing proceeds to step 365.

Finally, in step 365 the data objects are clustered based on the matches that were identified. In the preferred embodiments, this step 365 is performed by first constructing a graph in which each of the data objects is a node in each of the matches is represented as an arc between the nodes. Then, the clustering is performed using a min-cut technique or any other known approach for segmenting such a graph into clusters.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shows in the drawings and described above. Rather, it is intended that all such variations not departing from the spirit of the invention be considered as within the scope thereof as limited solely by the claims appended hereto.

What is claimed is:

1. A method of identifying matching objects in a computer database, comprising:

inputting a query data object as a set of attribute-value pairs, individual ones of the attribute-value pairs including an identified attribute and a value for the identified attribute;

after inputting the query data object, assigning a plurality of characteristic fingerprints to individual ones of the attribute-value pairs in the set of attribute-value pairs to yield a set of characteristic fingerprints, said characteristic fingerprints having been selected from an attribute-specific field of available characteristic fingerprints based on the value for the identified attribute;

after assigning the characteristic fingerprints, selecting a subset of at least one characteristic fingerprint from across the characteristic fingerprints for the query data object, based on a selection criterion, the subset of the at least one characteristic fingerprint that is selected being lesser in number than the set of characteristic fingerprints; and after selecting the subset, searching the computer database for the objects in the computer database that match the query data object as originally input as the set of attribute-value pairs by using the subset of at least one characteristic fingerprint to query the database, and not using any characteristic fingerprint not in the subset, to yield database results regarding the query object, wherein for the identified attribute, the characteristic fingerprints are assigned to values of the identified attribute based on:

a first parameter specifying a number of allowable values that the identified attribute can have;

a second parameter specifying how far apart the values of the identified attribute can be to not have any commonality with respect to the identified attribute; and a third parameter specifying a size of a field of potential fingerprints from which the characteristic fingerprints are selected for assignment to the values of the identified attribute, the third parameter based on the first parameter and the second parameter.

2. A method according to claim 1, wherein different potential values for the identified attribute result in different groups of characteristic fingerprints within the attribute-specific field of available characteristic fingerprints.

3. A method according to claim 2, wherein the different groups of characteristic fingerprints are identified by shifting a selection template a fixed amount over the attribute-specific field of available characteristic fingerprints for each increment in the potential value for the identified attribute.

4. A method according to claim 1, wherein the characteristic fingerprints within the attribute-specific field of available characteristic fingerprints for a particular attribute comprise cryptographic hashes of information chunks that are specific to set particular attribute.

5. A method according to claim 1, wherein the value for each identified attribute is selected from a range of discrete values.

6. A method according to claim 1, wherein the attribute-specific field of available characteristic fingerprints is at least two-dimensional.

7. A method according to claim 1, wherein a number of the characteristic fingerprints assigned in said assigning step is dependent upon the identified attribute, and wherein the number is larger for attributes having greater importance.

8. A method according to claim 1, wherein a number of the characteristic fingerprints assigned in said assigning step is dependent upon the value for the identified attribute.

9. A method according to claim 1, further comprising a step of repeating said inputting, assigning, selecting and querying steps for a plurality of different query data objects.

10. A method according to claim 9, further comprising a step of clustering the plurality of different query data objects based on the matches identified.

11. A method according to claim 1, further comprising a step of identifying a cluster of similar data objects based on the matches identified.

12. A method according to claim 11, further comprising a step of obtaining and outputting information pertaining to the cluster.

13. A method according to claim 1, wherein the query of the database also uses a specified matching criterion.

14. A method according to claim 1, further comprising a step of using the matches that are identified for collaborative filtering.

15. A non-transitory computer-readable medium storing computer-executable process steps for identifying matching objects in a computer database, said process steps comprising:

inputting a query data object as a set of attribute-value pairs, individual ones of the attribute-value pairs including an identified attribute and a value for the identified attribute;

after inputting the query data object, assigning a plurality of characteristic fingerprints to individual ones of the attribute-value pairs in the set of attribute-value pairs to yield a set of characteristic fingerprints, said characteristic fingerprints having been selected from an attribute-specific field of available characteristic fingerprints based on the value for the identified attribute;

after assigning the characteristic fingerprints, selecting a subset of at least one characteristic fingerprint from across the characteristic fingerprints for the query data object, based on a selection criterion, the subset of the at least one characteristic fingerprint that is selected being lesser in number than the set of characteristic fingerprints; and after selecting the subset, searching the computer database for the objects in the computer database that match the query data object as originally input as the set of attribute-value pairs by using the subset of at least one characteristic fingerprint to query the database, and not using any characteristic fingerprint not in the subset, wherein for the identified attribute, the characteristic fingerprints are assigned to values of the identified attribute based on:

a first parameter specifying a number of allowable values that the identified attribute can have;

a second parameter specifying how far apart the values of the identified attribute can be to not have any commonality with respect to the identified attribute; and a third parameter specifying a size of a field of potential fingerprints from which the characteristic fingerprints are selected for assignment to the values of the identified attribute, the third parameter based on the first parameter and the second parameter.

16. A non-transitory computer-readable medium according to claim 15, wherein different potential values for the identified attribute result in different groups of characteristic fingerprints within the attribute-specific field of available characteristic fingerprints.

17. A non-transitory computer-readable medium according to claim 16, wherein the different groups of characteristic fingerprints are identified by shifting a selection template a fixed amount over the attribute-specific field of available characteristic fingerprints for each increment in the potential value for the identified attribute.

* * * * *